J. G. PERRY.
Sausage Stuffer.
No. 27,828. Patented April 10, 1860.
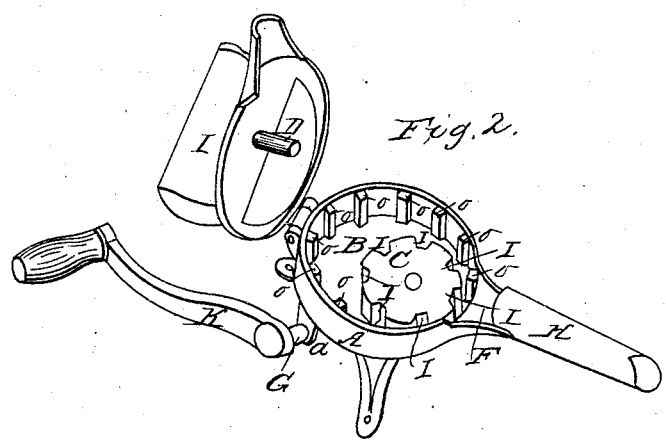
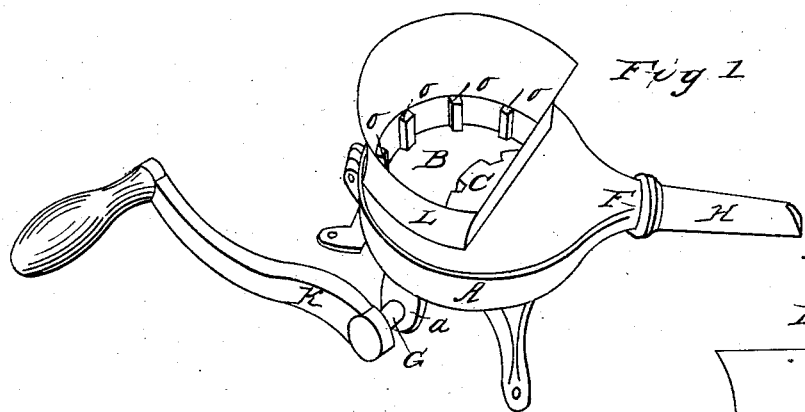
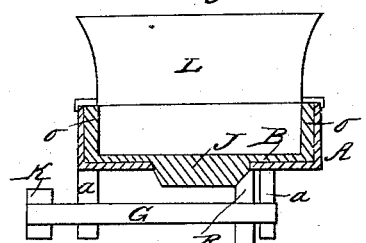
Witnesses:
Watkins Updike
Oliver H. Perry
Inventor
John G. Perry.

UNITED STATES PATENT OFFICE.

JOHN G. PERRY, OF SOUTH KINGSTON, RHODE ISLAND.

SAUSAGE-STUFFER.

Specification of Letters Patent No. 27,828, dated April 10, 1860.

*To all whom it may concern:*

Be it known that I, JOHN G. PERRY, of South Kingston, in the county of Washington, in the State of Rhode Island, have invented a new and Improved Machine for Filling Sausages; and I do hereby declare that the following is a full and correct description thereof, reference being had to the accompanying drawings and to letters of reference marked thereon.

Similar letters in different figures refer to the same parts.

Figure 1 is a perspective view of the machine. Fig. 2 is the same open, to show the arrangement of the inside. Fig. 3 is a vertical section through the center of the driving shaft.

To construct my improved filler, first make the case A, and fit into it a plate or wheel B, having a row of studs *o o o* around its outer edge; this wheel B is fitted to fill, and turn easily in the case, and has on its under side a bevel gear wheel J, which projects through an opening in the bottom of the case. A smaller wheel C, is made with recesses I I in its periphery, at a proper distance apart to receive the studs of wheel B, and revolves on the stud D, which is attached to the cover of the case. The wheel C is so placed as to be turned by the wheel B, by its studs *o o o* striking into the recesses in it, in a similar manner to gear wheels. On one side of the case A, is made a discharging orifice F, which is placed just one side of a line drawn through the centers of wheels B and C; in this orifice is put the tube H, to hold the cases to be filled. A short shaft G is placed across the machine underneath, supported in proper bearings *a a* attached to the bottom of the case A; this shaft has a bevel gear wheel R, at its inner end, that meshes into the bevel gear wheel J before mentioned, and has at its outer end a crank K, to turn it by. Around an opening in the cover of the case, is placed the hopper L, to receive the meat for filling the cases.

The operation of the machine is as follows: By turning the crank, the bevel gear on the shaft G causes the plate B to revolve, and that turns the smaller wheel C, by the studs *o o* meshing into the recesses in it; now as the meat is put into the hopper, it falls onto the plate B, and is carried in between the wheel C, and the studs *o o;* and as it approaches the point where the studs enter the recesses in the smaller wheel C, it is pressed through between the studs into the pipe, and out through the tube into the cases, which are placed upon it.

Having thus described my machine, what I claim as my invention and desire to secure by Letters Patent, is:

Combining the plate, or wheel B, with the tube H, substantially as described, and for the purposes herein set forth.

JOHN G. PERRY.

Witnesses:
WILKINS UPDIKE,
OLIVER H. PERRY.